(12) United States Patent
Haller

(10) Patent No.: US 9,296,321 B2
(45) Date of Patent: Mar. 29, 2016

(54) VEHICLE DAMPING DEVICE FOR A VEHICLE SEAT / VEHICLE CABIN

(75) Inventor: Erwin Haller, Birgland (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 13/230,441

(22) Filed: Sep. 12, 2011

(65) Prior Publication Data

US 2012/0090930 A1   Apr. 19, 2012

(30) Foreign Application Priority Data

Sep. 13, 2010  (DE) .......................... 10 2010 045 114

(51) Int. Cl.
*B60N 2/52* (2006.01)
*B60N 2/50* (2006.01)

(52) U.S. Cl.
CPC  *B60N 2/52* (2013.01); *B60N 2/502* (2013.01); *B60N 2/505* (2013.01)

(58) Field of Classification Search
CPC ............ B60N 2/502; B60N 2/505; B60N 2/52
USPC .......... 188/282.4, 280; 267/131, 140.11, 133, 267/122, 64.15
See application file for complete search history.

(56) References Cited

U.S. PATENT DOCUMENTS

| | | |
|---|---|---|
| 2,118,456 A | 5/1938 | Whedon |
| 3,300,203 A | 1/1967 | Carter et al. |
| 3,704,767 A | 12/1972 | Takagi |
| 3,706,362 A | 12/1972 | Faure |
| 3,752,432 A | 8/1973 | Lowe |
| 4,151,973 A | 5/1979 | Sedlock |
| 4,213,594 A | 7/1980 | Pietsch et al. |
| 4,286,765 A | 9/1981 | Delgleize et al. |
| 4,350,317 A | 9/1982 | Aondetto |
| 4,408,744 A | 10/1983 | Thompson |
| 4,451,079 A | 5/1984 | Takahashi |
| 4,477,050 A | 10/1984 | Thompson et al. |
| 4,573,657 A | 3/1986 | Sakamoto |
| 4,645,169 A | 2/1987 | Mischer |

(Continued)

FOREIGN PATENT DOCUMENTS

| | | |
|---|---|---|
| CN | 100493951 C | 6/2009 |
| DE | 1 898 307 U | 8/1964 |

(Continued)

OTHER PUBLICATIONS

Office Action for German patent application No. 10 2010 048 210.2, mailed Jul. 7, 2011.

(Continued)

*Primary Examiner* — Robert A Siconolfi
*Assistant Examiner* — Charles Poon
(74) *Attorney, Agent, or Firm* — Lathrop & Gage LLP

(57) ABSTRACT

The invention concerns a vehicle damping device for a vehicle seat (1)/vehicle cabin with a fixed lower part (5) and an upper part (4) vibrating in relation to the lower part (5) and at least one damper (9) arranged in between, where in a damping force-speed diagram, with rising speed (11) of the vibrating upper part (4) in relation to the fixed lower part (5), a damping force (10) of the damper (9) develops such that the damping force (10) in a first speed range (15) has a substantially linear first course (12) with a first gradient and in the second speed range (16, 18) a second course (14, 19) with a second gradient steeper than the first gradient.

10 Claims, 3 Drawing Sheets

(56) References Cited

U.S. PATENT DOCUMENTS

Figure 1:
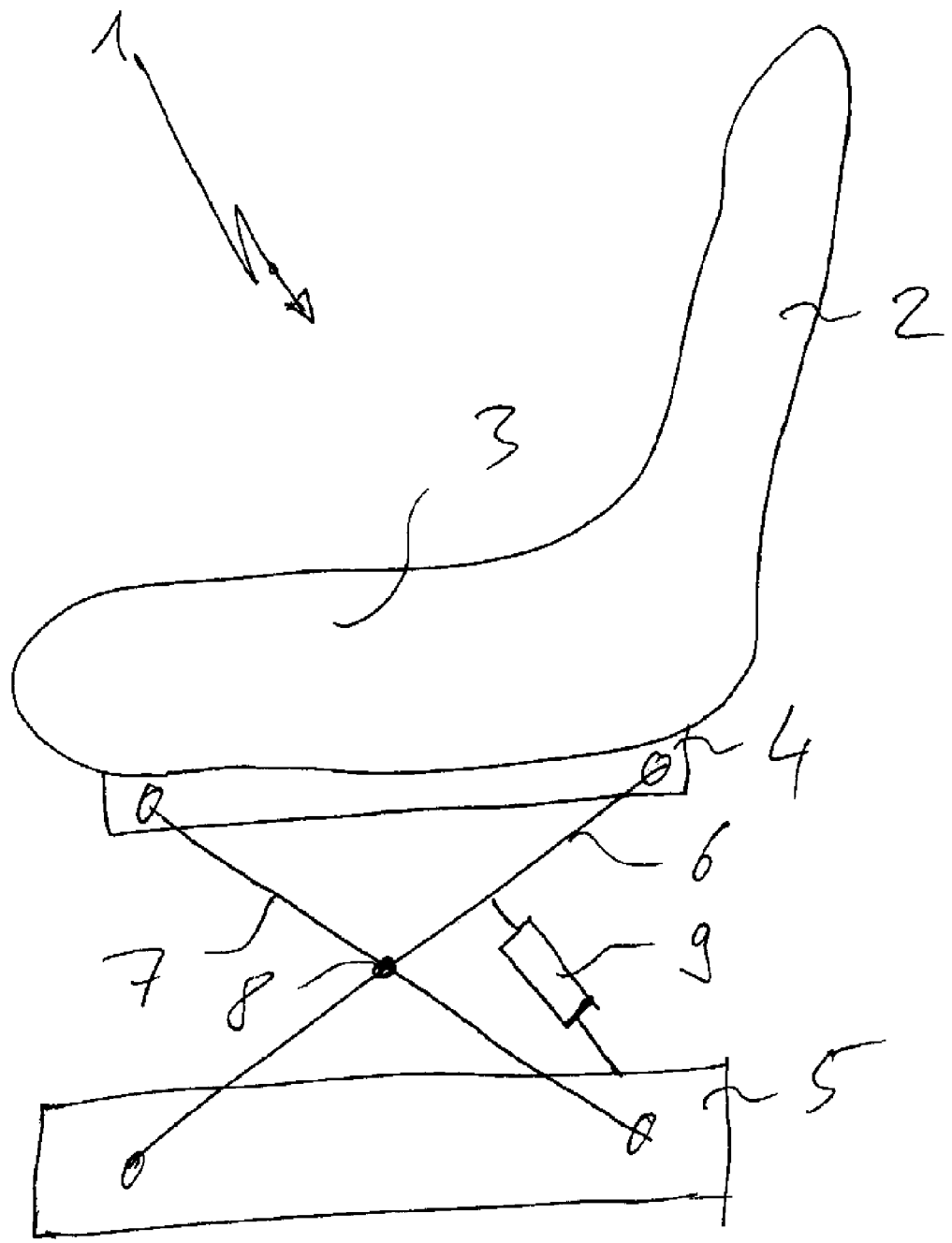

| | | |
|---|---|---|
| 4,679,760 A | 7/1987 | Dotzler et al. |
| 4,684,100 A | 8/1987 | Grassl |
| 4,729,539 A | 3/1988 | Nagata |
| 4,773,671 A * | 9/1988 | Inagaki ............ 188/266.4 |
| 4,784,434 A | 11/1988 | Iwami |
| 4,856,763 A | 8/1989 | Brodersen et al. |
| 4,943,037 A | 7/1990 | Brodersen et al. |
| 4,961,482 A | 10/1990 | Pohlenz et al. |
| 4,993,778 A | 2/1991 | Colin et al. |
| 5,058,852 A | 10/1991 | Meier et al. |
| 5,125,631 A | 6/1992 | Brodersen et al. |
| 5,211,369 A | 5/1993 | Hoemer |
| 5,251,864 A | 10/1993 | Itou |
| 5,364,060 A | 11/1994 | Donovan et al. |
| 5,521,821 A * | 5/1996 | Shimizu et al. ............ 701/37 |
| 5,533,703 A | 7/1996 | Grassl et al. |
| 5,553,911 A | 9/1996 | Bodin et al. |
| 5,580,027 A * | 12/1996 | Brodersen ............ 248/564 |
| 5,582,385 A | 12/1996 | Boyle et al. |
| 5,735,509 A | 4/1998 | Gryp et al. |
| 5,765,802 A | 6/1998 | Bostrom et al. |
| 5,791,738 A | 8/1998 | Niezoldt |
| 5,794,911 A | 8/1998 | Hill |
| 5,871,198 A | 2/1999 | Bostrom et al. |
| 5,957,426 A | 9/1999 | Brodersen |
| 5,967,604 A | 10/1999 | Yoshida et al. |
| 5,971,116 A * | 10/1999 | Franklin ............ 188/282.4 |
| 6,042,093 A | 3/2000 | Garelick |
| 6,340,201 B1 | 1/2002 | Higuchi |
| 6,478,102 B1 | 11/2002 | Puterbaugh et al. |
| 6,543,755 B2 | 4/2003 | Monson et al. |
| 6,616,116 B1 | 9/2003 | Rochau et al. |
| 6,637,735 B2 | 10/2003 | Monson et al. |
| 6,763,550 B2 | 7/2004 | Regnier |
| 6,802,408 B2 | 10/2004 | Krammer |
| 7,044,553 B2 | 5/2006 | Ropp |
| 7,152,839 B2 | 12/2006 | Mullinix et al. |
| 7,168,671 B2 | 1/2007 | Bostrom et al. |
| 7,185,867 B2 | 3/2007 | Hill et al. |
| 7,377,533 B2 | 5/2008 | Takeuchi et al. |
| 7,712,836 B2 | 5/2010 | Deml |
| 7,810,884 B2 | 10/2010 | Lorey et al. |
| 7,886,882 B2 * | 2/2011 | Behmenburg et al. ..... 188/282.4 |
| 7,942,248 B2 | 5/2011 | St. Clair et al. |
| 8,118,287 B2 | 2/2012 | Schordine |
| 8,457,841 B2 | 6/2013 | Knoll et al. |
| 2001/0035600 A1 | 11/2001 | St. Clair |
| 2002/0011699 A1* | 1/2002 | St.Clair ............ 267/131 |
| 2006/0243548 A1 | 11/2006 | Stein et al. |
| 2006/0278805 A1 | 12/2006 | Haller |
| 2007/0278723 A1* | 12/2007 | Shoemaker et al. .......... 267/131 |
| 2007/0295882 A1* | 12/2007 | Catton ............ 248/588 |
| 2008/0000738 A1* | 1/2008 | Zdeb ............ 188/315 |
| 2008/0000739 A1* | 1/2008 | Behmenburg et al. ... 188/322.15 |
| 2008/0088165 A1 | 4/2008 | Deml |
| 2008/0156602 A1* | 7/2008 | Hiemenz et al. ............ 188/267.1 |
| 2008/0197684 A1 | 8/2008 | Ott et al. |
| 2009/0134595 A1 | 5/2009 | Haller et al. |
| 2009/0179390 A1* | 7/2009 | Wurmthaler et al. ...... 280/5.519 |
| 2009/0184448 A1 | 7/2009 | Hiser |
| 2009/0256293 A1* | 10/2009 | Ward ............ 267/131 |
| 2009/0283944 A1 | 11/2009 | Schordine |
| 2010/0052356 A1 | 3/2010 | Lewis, II |
| 2010/0072685 A1 | 3/2010 | Golpe et al. |
| 2010/0072800 A1 | 3/2010 | Weber et al. |
| 2010/0102493 A1 | 4/2010 | Deml et al. |
| 2010/0117428 A1 | 5/2010 | Deml et al. |
| 2011/0001033 A1 | 1/2011 | Kohl et al. |
| 2011/0001342 A1 | 1/2011 | Deml et al. |
| 2011/0022265 A1* | 1/2011 | Sekiya ............ 701/37 |
| 2011/0226930 A1 | 9/2011 | Enns et al. |
| 2011/0278894 A1 | 11/2011 | Lorey |
| 2012/0025577 A1 | 2/2012 | Kolb |
| 2012/0043798 A1 | 2/2012 | Haller et al. |
| 2012/0049421 A1 | 3/2012 | Haller et al. |
| 2012/0086159 A1 | 4/2012 | Kolb |
| 2012/0090930 A1 | 4/2012 | Haller |
| 2012/0091773 A1 | 4/2012 | Lorey |
| 2012/0126592 A1 | 5/2012 | Kaessner et al. |
| 2012/0153689 A1 | 6/2012 | Haller et al. |
| 2012/0153695 A1 | 6/2012 | Haller et al. |
| 2012/0187615 A1 | 7/2012 | Haller et al. |

FOREIGN PATENT DOCUMENTS

| | | |
|---|---|---|
| DE | 15 55 056 | 3/1970 |
| DE | 19 16 403 A1 | 10/1970 |
| DE | 2022021 | 11/1970 |
| DE | 21 13 579 | 10/1972 |
| DE | 28 06 247 C2 | 8/1979 |
| DE | 28 11 034 A1 | 9/1979 |
| DE | 28 51 129 A1 | 6/1980 |
| DE | 32 42 287 A1 | 5/1984 |
| DE | 35 17 345 A1 | 11/1986 |
| DE | 3813402 | 11/1989 |
| DE | 38 24 272 A1 | 3/1990 |
| DE | 41 01 221 A1 | 7/1992 |
| DE | 9402417 | 4/1994 |
| DE | 696 06 732 T2 | 4/1995 |
| DE | 197 56 252 A1 | 7/1998 |
| DE | 197 41 602 A1 | 3/1999 |
| DE | 603 20 456 T2 | 12/2002 |
| DE | 699 08 290 | 5/2004 |
| DE | 10347219 | 5/2005 |
| DE | 10 2005 028 725 A1 | 1/2006 |
| DE | 10 2006 016 047 B3 | 4/2006 |
| DE | 10 2005 003 833 | 6/2006 |
| DE | 10 2005 011 856 B3 | 8/2006 |
| DE | 602005001868 | 12/2007 |
| DE | 10 2007 030 467 A1 | 1/2009 |
| DE | 102008040011 | 5/2009 |
| DE | 10 2008 016 685 B3 | 6/2009 |
| DE | 10 2008 010 719 A | 8/2009 |
| DE | 10 2008 045 492 A1 | 3/2010 |
| DE | 10 2008 052 960 | 4/2010 |
| DE | 10 2008 056 200 A1 | 5/2010 |
| DE | 10 2009 020 034 A1 | 11/2010 |
| DE | 10 2009 040 010 A1 | 1/2011 |
| EP | 0 054 880 A1 | 12/1981 |
| EP | 0 054 947 A1 | 12/1981 |
| EP | 0 089 794 | 9/1983 |
| EP | 0 448 340 A2 | 9/1991 |
| EP | 0 739 766 | 10/1996 |
| EP | 1 035 258 A1 | 6/1999 |
| EP | 2 420 404 | 2/2012 |
| GB | 1 166 258 | 10/1969 |
| GB | 1199577 | 7/1970 |
| GB | 1 383 922 | 2/1974 |
| GB | 2 014 522 | 8/1979 |
| JP | 63220026 A | 9/1988 |
| JP | 1237471 A | 9/1989 |
| JP | 09136611 | 5/1997 |
| JP | 2007 062 539 A | 3/2007 |
| WO | WO 2004/110808 | 12/2004 |

OTHER PUBLICATIONS

Office Action for German patent application No. 10 2010 051 325.3, mailed Oct. 10, 2011.
Office Action for German Patent Application No. 10 2010 055 342.5, mailed Oct. 6, 2011.
Extended European Search Report for parallel European Patent Application No. 11 19 5031, mailed Apr. 5, 2012.
Office Action for German Patent Application No. 10 2010 055 344.1, mailed Oct. 5, 2011.
Examination Report dated Aug. 24, 2012, from the German Patent Office for German Patent Application No. 10 2010 026 569.1.
First Office Action dated Mar. 29, 2012 for Chinese Patent Application No. 201010244916.3.
First Office Action dated Mar. 29, 2012 for Chinese Patent Application No. 201010244916.3, English translation.
Office Action, Chinese Patent Application No. 201110052443.1, dated Dec. 30, 2012.

(56) References Cited

OTHER PUBLICATIONS

Office Action, Chinese Patent Application No. 201110052443.1, dated Dec. 30, 2012, English Translation.

Extended European Search Report for parallel European Patent Application No. 11 19 5039, mailed Apr. 5, 2012.

Examination Report for German Patent Application No. 10 2011 009 530.6 dated May 4, 2012.

Extended European Search Report for European Patent Application No. 12 15 9863, dated Jul. 4, 2012.

Office Action for German Patent Application No. 10 2011 015 364.0, mailed Feb. 6, 2012.

Search Report for European Patent Application No. 11177689.4, mailed Dec. 14, 2011.

Office Action for German Patent Application No. 10 2010 035 888.6 mailed Jun. 9, 2011.

Office Action corresponding to German Patent Application No. 102010045114.2, completed Nov. 8, 2013.

European Search Report for European Patent Application No. 12 159 863.5, mailed Jul. 10, 2013.

\* cited by examiner

VEHICLE DAMPING DEVICE FOR A VEHICLE SEAT / VEHICLE CABIN

CROSS REFERENCE TO RELATED APPLICATION

This application claims the benefit of priority from German Patent Application No. 10 2010 045 114.2, filed on Sep. 13, 2010, which is hereby incorporated by reference in its entirety.

DESCRIPTION

The invention concerns a vehicle damping device for a vehicle seat/vehicle cabin with a fixed lower part and an upper part oscillating in relation to the lower part and at least one damper arranged in between.

Conventionally vehicle seats and/or vehicle cabin are mounted against a base element i.e. in the case of a vehicle seat against an under part of the vehicle seat which is fitted to a vehicle cabin floor or a vehicle frame part, or vehicle body part fitted with springing systems which not only comprise at least one air spring or similar but also at least one damper. Such dampers are usually constructed such that in a diagram or graph in which the damping force of the damper is shown against the speed of two parts oscillating in relation to each other in a system of a vehicle seat or vehicle cabin, a curve results which starts at a speed of 0 m/s and runs virtually linearly steadily upwards. This means that with increasing speed of an oscillation induced between two parts in the system of a vehicle seat or vehicle cabin, an increasing damping force is active wherein the damping force rises proportionally in relation to the increasing speed and thus has a linear course in its curve in such a diagram.

Depending on whether soft or hard damping of the vehicle seat or cabin is desired, such a curve runs with varying gradient. This means that a damper with rather soft damping properties has a curve with a low rise or shallow gradient while a damper with hard damping characteristics has a curve with steeper gradient.

When a vehicle in which such a sprung vehicle seat or sprung vehicle cabin is arranged drives over an uneven road, such as for example when a truck is used in the form of a tractor, usually a damper with soft damping properties is required for the presence of small unevennesses. This may be when driving over a road or off-road with few unevennesses, such as over a meadow or compacted field track. This allows the slight unevennesses to be optimally compensated in the springing system of the vehicle seat or vehicle cabin by the soft damping properties and thus there is little force transfer from the oscillations induced in the system to the driver sitting on the vehicle seat or standing in the vehicle cabin.

On poor road surfaces such as for example a field or poorly compacted field track, severe oscillations due to the surface covered are induced in the truck and hence the springing system of the vehicle seat and/or vehicle cabin. As a result the damper and also an air spring arranged between the upper and lower part of the vehicle seat and/or vehicle cabin can reach their end stops as there is an extreme deflection of the damper and/or air spring. Consequently in this case a damper with hard damping properties is desired to prevent such reaching of end stops, also called blocking of the spring system, by the damper and/or air spring. Such hard damping properties are achieved by creation of a high damping force within the damper.

To provide vehicle seats and/or vehicle cabin with both properties i.e. with a damper which has both soft and hard damping properties, it is known that damping systems are provided which allow and enable switching between a soft damping mode and a hard damping mode.

However the problem frequently arises that if a truck moves from a slightly uneven road surface to an off-road region with great unevenness, the driver either forgets to switch the damping system from "soft" mode to "hard" mode or cannot make the switch sufficiently early, so that end stops are reached under sudden severe oscillations due to driving over very uneven ground. This substantially reduces the driver's seating comfort.

Conversely when changing from driving off-road with great unevenness to a road surface with only slight unevenness, there is a high risk that the damping system, if switched too late or not at all, at least initially remains in "hard" damping mode and as a result the vibrations induced at low force and speed into the vehicle seat and/or vehicle cabin system are damped in "hard" mode. This means that the damper applies a hard damping force to oppose the force of the vibration induced and hence only a slight damping occurs. Rather each vibration pulse of the oscillation induced would be transmitted to the driver and/or vehicle cabin almost undamped. This has the consequence that the seating comfort of the driver is substantially reduced.

Consequently the object of the invention is to provide a vehicle damping device for a vehicle seat and/or a vehicle cabin which provides a high damping and seating comfort when driving over surfaces with unevenness of varying severity.

The core concept of the invention is that in a vehicle damping device for a vehicle seat/vehicle cabin with a fixed lower part and an upper part oscillating in relation to the lower part and at least one damper arranged in between, in a damping force-speed diagram, with increasing speed of the vibrating upper part in relation to the fixed lower part, a damping force of the damper develops such that the damping force in the first speed range has a substantially linear first course with a first gradient and in a second speed range a second course with a second gradient steeper than the first. Such a damper can advantageously damp a vehicle seat and/or vehicle cabin such that when driving over a road surface with slight unevenness, which leads to initiation of oscillation in the system of the vehicle seat and/or cabin at low oscillation speeds, a soft damping or attenuation is applied, and as soon the vehicle, which can be a truck in the form of a tractor, drives over a surface with great unevenness such as for example a field, a greater damping/attenuation takes place in the system of the vehicle seat/cabin as the oscillations induced by the great unevenness have a high speed which leads to a greater damping force of the damper in the second speed range.

The damper thus has two working ranges depending on the two speed ranges, but can also have more than two working ranges or speed ranges in order where applicable to achieve a more detailed stepping of the curve and hence the damping function in several damping ranges with different damping forces.

A transition between the first and second course of the damping force takes place automatically at a specific speed which is predeterminable and can be set arbitrarily individually. This transition is step-like so that in the second speed range the curve assumes a different gradient within the shortest time.

According to a preferred embodiment, for the first speed range induced oscillation speeds of 0 m/s to 0.1 m/s are proposed, whereas in the second speed range speeds equal to or more than 0.1 m/s are proposed.

The rise in damping force can also be travel-dependent and not just speed-dependent.

According to a preferred embodiment the rise of damping force in the tension direction is different from or the same as that in the compression direction of the damper. This means that on reverse movement, the damper either has the same damping properties i.e. the same working ranges or speed ranges and the same switching point or the same transition as on forward movement, or in contrast different speed ranges which differ in their transition or switching point, i.e. specific speed, and where applicable in the gradient of the damping force within the individual speed ranges.

According to a preferred embodiment the rise in damping force in the two speed ranges can be set independently so that in the two speed ranges or working ranges the curve has gradients which can be set differently. It is only important here that in the first speed range which begins at a speed of 0 m/s, the curve has a shallower gradient so that a "soft" working mode can be achieved with the damping device, than the gradient in the second speed range in which the working mode is "hard".

The damper is designed such that it is switchable on transition from a first and a second working range. The working ranges allocated to the two speed ranges can for example be obtained in that, in a damper with a piston, a first through bore with a first diameter is present for passage of a fluid from a first chamber into a second chamber. This bore is covered above a particular speed of the induced vibration and instead a second bore is opened which has a smaller diameter and hence allows the piston to move to and fro more slowly within the damper under an induced vibration. This has the consequence that on passage of the fluid through the second bore, work mode "hard" is set. The speeds can be measured by means of an integral sensor.

Benefits and suitable features are given in the description below in conjunction with the drawings.

Figure 2:
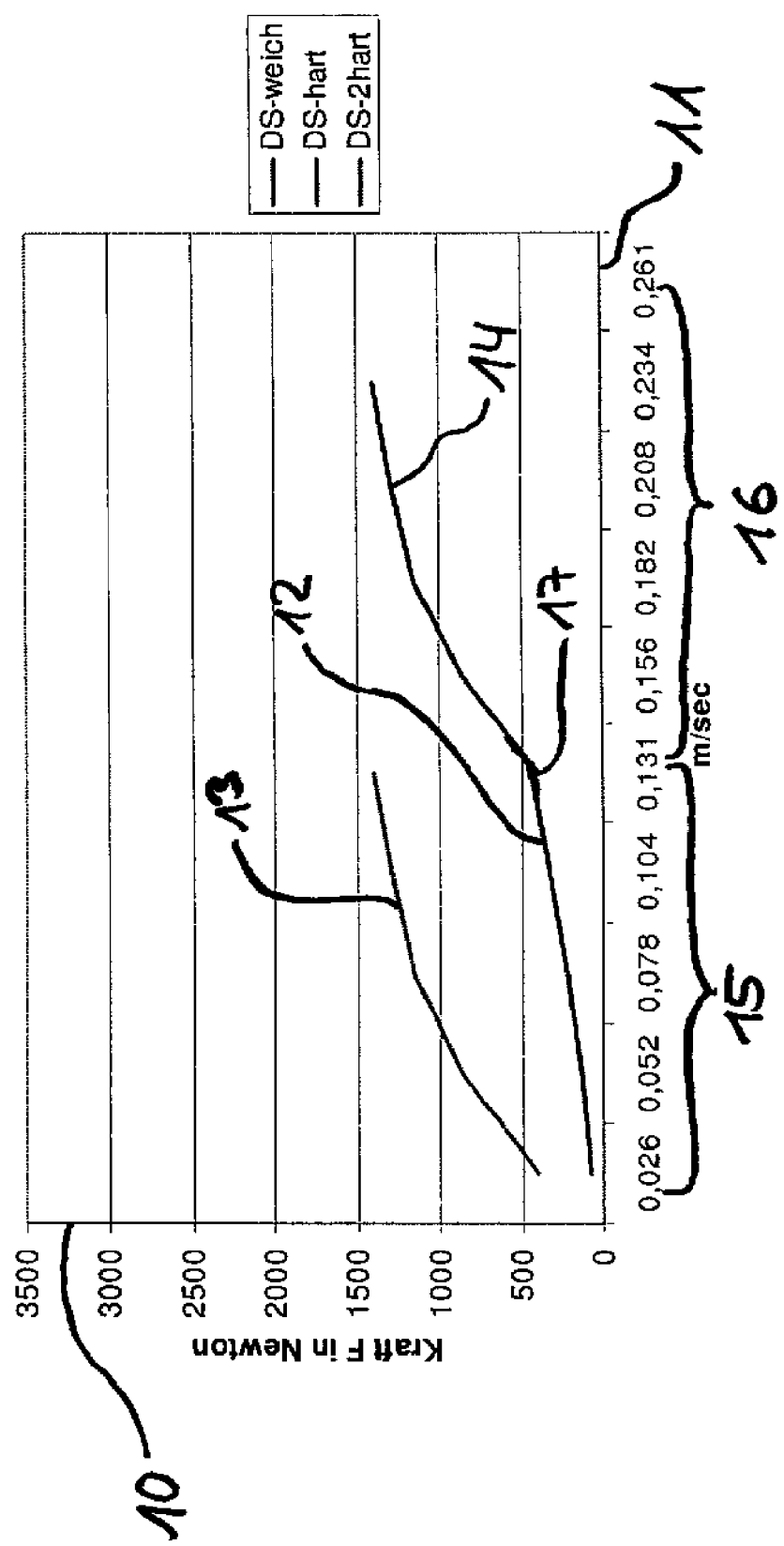
Figure 3:
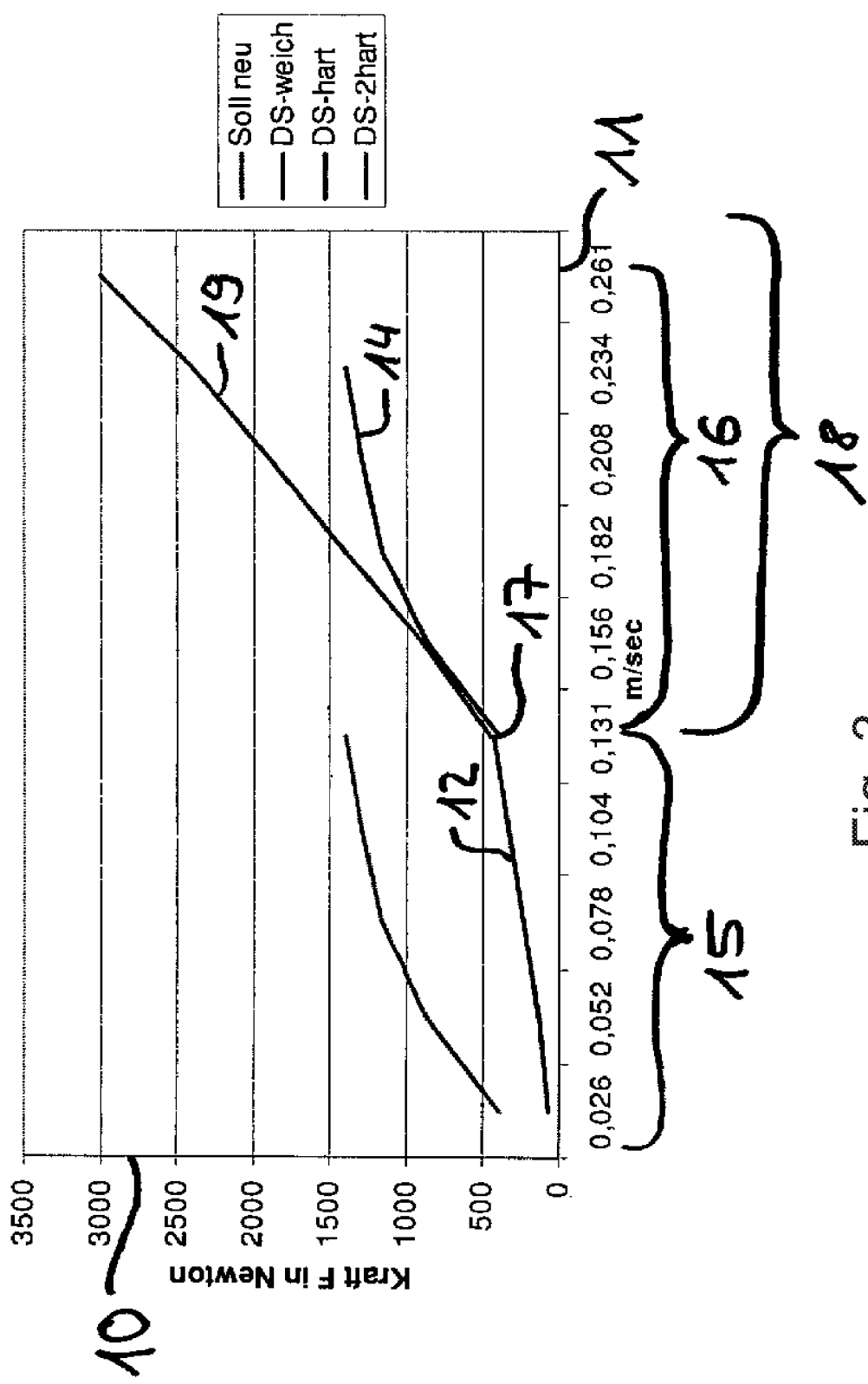

These show:

FIG. 1 a basic principle of a vehicle seat with two parts oscillating in relation to each other and a damper;

FIG. 2 a damping force-speed diagram which shows the curve of a vehicle damping device according to the invention; and FIG. 3 a damping force-speed diagram which shows the curve of a vehicle damping device according to the invention in a second embodiment of the invention.

FIG. 1 shows in diagrammatic view a vehicle seat 1 with a back rest 2 and a seat part 3. The seat part 3 is arranged on the vehicle seat upper part 4 which is mounted oscillating in the vertical direction in relation to a base element 5 connected with a vehicle floor or vehicle cabin floor.

FIG. 2
Kraft F in Newton=Force F in Newton
DS weich=damper mode soft
DS hart=damper mode hard
DS 2hart=damper mode 2 hard
FIG. 3
Kraft F in Newton=Force F in Newton
Soll neu=nominal when new
DS weich=damper mode soft
DS hart=damper mode hard
DS 2hart=damper mode 2 hard To attach the upper part 4 to the lower part 5 for example two scissor arms 6, 7 are arranged which are connected together at a pivot 8.

A damper 9 is attached for example with one end at one of the scissor arms (6, 7) and with a further end at the lower part 5. Also an air spring 9a can be arranged for springing the oscillating-mounted vehicle seat between the scissor arm 16, 7) and the base element 5.

FIG. 2 shows the curve of a vehicle damping device according to the invention in a first embodiment of the invention in a damping force-speed diagram. A further curve is also given in this diagram which is used in previously known sprung and damped vehicle seats.

The ordinate shows the force of the damper i.e. the damping force according to reference numeral 10. This damping force is the damper force countering the oscillation induced due to passing over an uneven road surface. The abscissa 11 shows the speed of the oscillation induced due to passing over an uneven road surface.

Such a speed-dependent damper previously had two working modes 12, 13 with curves which each began at an induced vibration speed of 0 m/s and different gradients and associated damping forces depending on whether a "soft" work mode was set according to curve 12 or a "hard" work mode according to curve 13. Consequently a damper is known with different working modes "soft" and "hard" according to curves 12 and 13, but such a working mode is present for the entire speed range in which the damper works so that either the damper achieves exclusively a "hard" working mode according to curve 13 or exclusively a "soft" working mode.

According to the invention a vehicle seat or a vehicle cabin with the vehicle damping device according to a first embodiment has a curve that is a combination of curve 12, which has an almost linear course but also can alternatively have a curve which has a constantly increasing gradient or a constantly decreasing gradient, and curve 14. The first curve section 12 is arranged in the first speed range 15 and the second curve section is arranged in the second speed range 16.

The second curve section 14 shows a curve with a decreasing gradient as shown in FIG. 2. This can be achieved in that the damper is fitted with a valve system which causes a degressive course of the curve section. However this degressive curve is not necessarily required. Here the curve in this speed range 16 has rather a progressive course because of the hydraulic properties of the damper. This progressive course is however only slightly pronounced, as is evident from a curve with a slightly steepening gradient.

The transition of curve sections 12 and 14 from a first speed range 15 to a second speed range 16 takes place at a specific speed at point 17 which can be set individually. It is clear from this depiction that this transition can be step-like i.e. not smooth.

Thus a vehicle damping device according to the invention in a first speed range 15 has a low damping force with a working range in "soft" work mode and in the second speed range 16 a high damping force with a second working range in "hard" work mode. This means that from a particular speed 17, a hard damping occurs while before the switch point 17, a soft damping occurred.

FIG. 3 shows a further damping force-speed diagram of a vehicle damping device according to a second embodiment of the invention. The same and similar ranges, curves etc. are given the same reference numerals.

It is clear from this depiction that the second speed range according to reference numeral 16 can have not only the curve 14 already shown in FIG. 2 with degressive course but also according to numeral 18 a curve 19 which has a slightly progressive course or an almost linear course.

It is also clear from this depiction that the curve 17 rises more steeply than curve 14 so that in the second speed range 18 a stronger damping force occurs with increasing induced vibration speed. Thus at higher speeds above the switch point 17, the truck can drive over greater unevennesses without the damper reaching its end stops and or seating comfort being reduced.

All features disclosed in the application documents are claimed as essential to the invention where novel individually or in combination in relation to the prior art.

LIST OF REFERENCE NUMERALS

1 Diagrammatic depiction of vehicle seat
2 Back rest
3 Seat part
4 Vehicle seat upper part
5 Vehicle cabin floor
6 Scissor arm
7 Scissor arm
8 Pivot for connecting scissor arms
9 Damper
9a Air spring
10 Damping force
11 Speed
12 Curve with "hard" work mode
13 First curve section
14 Second curve section
15 First speed range
16 Second speed range
17 Switch point
18 Second speed range
19 Curve

The invention claimed is:

1. A vehicle damping device for a vehicle seat (1) comprising a fixed lower part (5), an upper part (4) of the vehicle seat (1) vibrating in relation to the lower part (5), two or more scissor arms (6, 7) attaching the fixed lower part (5) to the upper part (4), and at least one damper (9) wherein one end of the damper (9) is mounted on one of said arms and a second end of the damper (9) is mounted on the fixed lower part (5), said damping device characterised in that in a damping force-speed diagram, with rising speed (11) of the vibrating upper part (4) in relation to the fixed lower part (5), a damping force (10) of the damper (9) develops such that the damping force (10) in a first speed range (15) has a linear first course (12) with a first gradient and in a second speed range (16, 18) a second course (14, 19) with a second gradient steeper than the first gradient, wherein the second gradient is always steeper than the first gradient independent of the position of a transition (17) of the damping force (10) from the first to the second course (12, 14, 19).

2. The vehicle damping device according to claim 1, wherein at a specific speed a transition (17) of the damping force (10) from the first (12) to the second (14, 19) course as a curve is step-like.

3. The vehicle damping device according to claim 1, wherein the first speed range (15) comprises speeds from 0 m/s to 0.1 m/s and the second speed range (16, 18) comprises speeds ≥0.1 m/s.

4. The vehicle damping device according to claim 1, wherein a rise of the damping force (10) is travel-dependent.

5. The vehicle damping device according to claim 4, wherein the rise in the damping force (10) in the tension direction and in the compression direction of the damper (9) is the same.

6. The vehicle damping device according to claim 4, wherein the rise in the damping force (10) in the tension direction and the compression direction of the damper (9) is different.

7. The vehicle damping device according to claim 4, wherein the rise in the damping force (10) in the first (15) and the second (16, 19) speed ranges can be set independently of each other.

8. The vehicle damping device according to claim 2, wherein the specific speed can be adjusted.

9. The vehicle damping device according to claim 2, wherein the damper (9) is switchable on the transition (17) from a first to a second working range, the first and the second working ranges allocated to the first (15) and the second (16, 19) speed ranges.

10. The vehicle damping device according to claim 1, wherein the two or more scissor arms (6, 7) are connected together at a pivot (8) so that the damper (9) is pivotally mounted on one of said arms and the fixed lower part (5).

* * * * *